Patented Oct. 31, 1967

3,350,489
POLYVINYLIDENE CYANIDE COMPOSITION AND METHOD OF PRODUCING FIBERS AND FILMS
Saunders Eliot Jamison, Summit, N.J., assignor to Celanese Corporation, a corporation of Delaware
No Drawing. Filed May 3, 1963, Ser. No. 277,698
15 Claims. (Cl. 264—203)

This invention relates to novel polymer solutions and to a method of preparing fibers and films from such solutions. More particularly, this invention relates to polymer solutions comprising a solvent mixture of trioxane and another solvent such as a ketone, nitrile, or hydrocarbon, which solution contain dissolved therein an appropriate polymeric material, e.g., a vinylidene cyanide copolymer or the like. The invention also relates to the application of such a polymer solution to the fibers, films, and the like, generally by extrusion of the polymer solution through a shaped orifice to form a fiber, or by the deposition of such polymer solution upon a surface followed by evaporation of the solvent mixture to thereby form a film.

The polymeric material to be dissolved in the foregoing solvent mixture is desirably a synthetic resinous material which possesses attractive fiber-forming and film-forming characteristics, e.g., copolymers of vinylidene cyanide and one or more other monomers copolymerizable therewith, vinyl chloride-vinyl acetate copolymers, resinous acrylic type polymers and copolymers.

The resinous copolymers of vinylidene cyanide which are contemplated herein generally contain in excess of about 45% of vinylidene cyanide (methylene malononitrile or vinylidene dinitrile) units copolymerized with one or more ethylenically unsaturated monomers such as vinyl acetate or the like, as described in U.S. Patents 2,615,865 through 2,615,880 inclusive; 2,628,954; 2,650,-911; 2,654,724; 2,654,728; 2,765,197; 2,716,104; 2,716,-105; 2,716,106; and 2,740,769 and Canadian Patent No. 569,262.

The copolymers usually comprise units of vinylidene cyanide alternated with one or more copolymerizable monomers selected from the following classes of compounds:

(1) Vinyl esters of alphatic monocarboxylic acids, preferably of the structure RCOOH, wherein R is an alkyl, such as vinyl acetate, vinyl propionate, vinyl butyrate, vinyl isobutyrate, vinyl valerate, vinyl caproate, vinyl enanthate and the like. The coplymerization with vinylidene cyanide of such copolymerizable monomers and the resulting copolymers are described more fully in U.S. Patent 2,615,866, issued Oct. 28, 1952.

(2) Vinyl esters of the structure

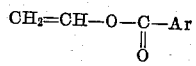

wherein Ar is an aromatic radical in which all the hydrogen atoms are attached to carbon atoms, such vinyl benzoate, homologs of vinyl benzoate of the formula

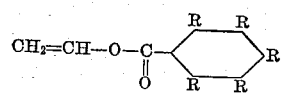

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, and similar vinyl halobenzoates and monomers of the above general class wherein the aromatic radical is alkoxy substituted, for example, vinyl p-methoxybenzoate, vinyl o-methoxybenzoate and vinyl o-methoxybenzoate and vinyl p-ethoxybenzoate. The copolymerization with vinylidene cyanide, of such monomers, and the resulting copolymers are disclosed in U.S. Patent 2,615,867, issued Oct. 28, 1952:

(3) Styrene and substituted styrenes of the general formula

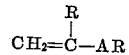

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5 - dichlorostyrene, 2,5 - dibromostyrene, ortho-, meta-, and paramethoxystyrene, para - alpha-dimethyl styrene, paramethyl styrene, 3,4-dichlorostyrene, 3,4-difluorostyrene, 2,4-dichlorostyrene, 2,4,5-trichlorostyrene, dichloromonofluorostyrenes and the like. Copolymerization of vinylidene cyanide with styrene and substituted styrenes is disclosed in U.S. Patent 2,615,868, issued Oct. 28, 1952:

(4) Olefins of the general structure

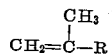

wherein R is an alkyl radical, preferably containing from 1 to 6 carbon atoms, such as isobutylene, (2-methyl propene-1), 2-methylbutene-1, 2-methylpentene-1, 2,3-dimethylbutene-1, 2,3-dimethyl-pentene-1, 2,3,3-trimethylbutene-1, 2,3,4 - trimethylpentene-1, 2,6 - dimethyloctene-1, 2-methylnondecene-1, and the like. Copolymerization of such olefins with vinylidene cyanide is disclosed in U.S. Patent 2,615,865, issude Oct. 28, 1952:

(5) Alkyl esters of methacrylic acid which possess the structure

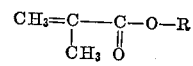

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide alkyl methacrylate copolymers and their preparation are disclosed in U.S. Patent 2,615,-871, issued Oct. 28, 1952:

(6) 2-halogenated monoolefins of the structure

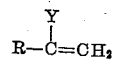

where R is a lower alkyl radical such as methyl, ethyl, propyl or butyl, and Y is a halogen atom, such as 2-chloropropene, 2 - chlorobutene, 2 - chloropentene, 2-chlorohexene, 2 - chloroheptene, 2 - bromobutene, 2-bromoheptene, 2 - fluorohexene, 2 - fluorobutene, 2-iodopropene, 2 - iodopentene, and the like, Copolymerization of these compounds with vinylidene cyanide is disclosed in U.S. Patent 2,615,877, issude Oct. 28, 1952:

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like; the copolymerization of all of which with vinylide cyanide is described in U.S. Patent 2,615,875, issued Oct. 28, 1952:

(8) Vinyl esters of alpha-halo saturated aliphatic monocarboxylic acids of the structure

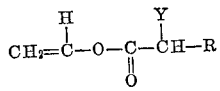

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-iodopropionate, vinyl alpha-bromovalerate and the like. The copolymerization of such monomers with vinylidene cyanide is described in U.S. Patent 2,615,876, issued Oct. 28, 1952:

(9) Vinyl halides such as vinyl chloride vinyl bromide and the like, which are copolymerized with vinylidene cyanide as described in U.S. Patent 2,615,869, issued Oct. 28, 1952:

In addition to interpolymers of vinylidene cyanide containing the essentially 1 to 1 molar alternating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in U.S. Patent 2,716,106.

Other polymerizable monoolefinic compounds form interpolymers with vinylindene cyanide, in addition to those set out above including, by way of example, the following classes of compounds:

Monoolefinic hydrocarbons, such as 2,3-dimethyl-hexene-1; 2,3,4-trimethyl-pentene-1; ethylene; propylene; butylene; amylene; hexylene and the like;

Esters of unsaturated acids other than methacrylic, e.g., of acrylic acid and tiglic acid such as methyl acrylate, ethyl acrylate, propyl acrylate, isopropyl acrylate, amyl acrylate, 3,5,5-trimethylhexylacrylate, dodecylacrylate and ethyl tiglate.

Allyl and substituted allyl esters such as allyl chloride, allyl cyanide, allyl bromide, allyl fluoride, allyl iodide, allyl nitrate, allyl thiocyanate, allyl butyrate, allyl benzoate, allyl 3,5,5-trimethyl hexoate, allyl lactate, allyl pyruvate, allyl acetoacetate, allyl thioacetate, as well as methallyl esters corresponding to the above allyl esters as well as esters from such alkenyl alcohols as beta-ethyl allyl alcohol, beta-propyl allyl alcohol, and 1-butene-4-ol:

Esters of substituted acrylic acids, such as methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate:

Esters of monethylenically unsaturated dicarboxylic acids, such as dimethyl maleate, diethyl maleate, dimethyl fumurate and diethyl fumurate:

Monoolefinically unsaturated organic nitriles such as acrylonitrile, methacrylonitrile, 1,1-dicyano propene-1, crotonitrile, oleonitrile and the like:

Monoolefinically unsaturated carboxylic acids such as acrylic acid, methacrylic acid, crotonic acid, butenoic acid, angelic acid, tiglic acid and the like:

Of these vinylidene cyanide copolymers a particularly useful copolymer which can readily be converted to filaments of excellent physical properties is the copolymer of vinylidene cyanide and vinyl acetate preferably consisting essentially of a regular structure of alternated units of the monomers, i.e., approximately 50 mol percent of each.

To improve the dyeability of the resultant fibers, the monomers making up the vinylidene cyanide copolymer may be copolymerized along with sufficient amount of an ethylenically unsaturated organic sulfonic acid to produce a copolymer containing about 0.15 to 2 mol percent of the sulfonic acid component.

Representative sulfonic acids which may be employed include styrene sulfonic acids, such as ortho-, meta- or para-styrene sulfonic acid as well as commercial mixtures thereof, ortho-, meta- or para-sulfomethyl styrene, mixtures thereof, substitution products thereof such as polysulfo derivatives as well as β-sulfoethyl methacrylate (isothionic acid ester of methacrylic acid), sulfonic acids wherein the sulfo group is less than three atoms removed from the ethylenic unsaturation, e.g., vinylsulfonic acid, allylsulfonic acid, methallyl sulfonic acid and the like.

It is frequently desirable to employ a mixture of more than one of the foregoing vinylidene cyanide polymers in order to form fibers, e.g., a mixture of a copolymer of vinylidene cyanide and vinylacetate and a terpolymer of vinylidene cyanide, vinyl acetate and an ethylenically unsaturated sulfonic acid or a salt thereof such as a styrene sulfonic acid or potassium styrene sulfonate. The fibers may also contain various additives in addition to the vinylidene cyanide polymer or polymers, e.g., a polymer of N,N-dimethyl acrylamide, a copolymer of N,N-dimethyl acrylamide and vinyl acetate, etc. Thus, the foregoing copolymer serves as an "opener" for the polymeric vinylidene cyanide fiber, thereby improving its dye receptivity in that a dye more readily diffuses into the fiber.

It will be understood that the invention finds application with polymeric materials other than the foregoing vinylidene cyanide copolymers. Such other polymeric materials, which materials exhibit desirable film-forming and fiber-forming characteristics, include polymeric acrylic materials, e.g., copolymers of acrylonitrile and vinylidene chloride, vinyl chloride-vinyl acetate copolymers, copolymers of vinyl chloride and acrylonitrile; etc.

In the polymeric material is a copolymer of acrylonitrile and vinylidene chloride, it is desirable that such copolymer contain a major proportion of acrylonitrile, and most preferably about 60% acrylonitrile and 40% vinylidene chloride. If the polymeric material is a copolymer of vinyl chloride and vinyl acetate such copolymer desirably contains a major proportion of vinyl chloride and most preferably from about 86 to 88% vinyl chloride and from about 14 to 12% of vinyl acetate. If a copolymer of vinyl chloride and acrylonitrile is utilized, such copolymer should desirably contain a major proportion of vinyl chloride, and preferably contains about 60% of vinyl chloride and 40% of acrylonitrile.

Accordingly, it is the object of the present invention to provide novel polymer solutions.

Another object is to provide novel polymer solutions which are adapted to be used in the preparation of fibers, films, and the like.

A further object is to provide a method of producing fibers and films having desirable properties.

Additional objects will become apparent hereinafter.

In accordance with one aspect of my invention, a suitable polymeric material having desirable fiber-forming and/or film-forming characteristics, e.g., a vinylidene cyanide copolymer as previously described, is dissolved in a solvent mixture of trioxane and another solvent such as a nitrile, a hydrocarbon, a ketone, or a mixture thereof.

The ketones utilized should be relatively voltatile. Accordingly, particular preference is accorded to acetone. The preferred nitrile is acetonitrile, and the preferred hydrocarbon is toluene.

The relative proportions of trioxane and other solvent(s) will, of course, vary depending upon the nature of the particular polymeric material to be dissolved therein. In general, the amount of trioxane should be from about 1 to 75% by weight of the solvent mixture, with the amount of other solvent(s) being correspondingly from about 99 to 25%. A more preferred range is from about 5 to 60% of trioxane and correspondingly from about 95 to 40% of other solvent(s).

The preferred amount of polymeric material dissolved in the foregoing solvent mixture is from about 5 to 35% by weight of the overall solution.

Where the polymeric material to be dissolved is a vinylidene cyanide copolymer and the solvent mixture therefor comprises trioxane and a nitrile such as acetonitrile, the relative proportions are generally from about 20 to 60% by weight of trioxane and correspondingly from about 80 to 40% by weight of nitrile (based on the total solvent mixture), a more preferred range being from about 30 to 50% of trioxane and from about 70 to 50% of nitrile. For optimum fiber or film formation from such a solution, the amount of vinylidene cyanide copolymer dissolved therein should be from about 10 to 30% by weight of the overall solution.

Where a solvent mixture of trioxane and a ketone such as acetone is employed, the amount of trioxane is generally from about 40 to 80% and the amount of ketone from about 60 to 20% by weight (based on the total solvent mixture), a more preferred range being from about 50 to 60% of trioxane and from about 50 to 40% of ketone. The amount of vinylidene cyanide copolymer dissolved therein may vary from about 5 to 25% by weight of the overall solution.

If the solvent mixture comprises trioxane and a hydrocarbon such as toluene, then the amount of trioxane used is desirably the minimum needed such that the solvent mixture exerts adequate dissolving power upon the polymeric material. Thus, in Example 7 hereinafter, about 32% trioxane in the solvent permitted the formation of polymer solution more easily than did a trioxane concentration of about 22%.

I have found that by utilizing a mixture of trioxane and acetonitrile as the mixture, the resultant polymer solution exhibits fluidity at relatively low temperatures. Thus, when the solvent mixture consists of trioxane and acetonitrile and the polymeric material dissolved therein is a vinylidene cyanide copolymer such as vinylidene cyanide-vinyl acetate copolymer, the resultant polymer solution is fluid at 25° C. This is highly advantageous in that such a solution is capable of flowing through tubes, pipes, or channels, without the necessity of initially preheating such conduits. This is highly desirable in that it permits vastly simpler handling techniques. Moreover, such low temperature fluidity is unexpected, because when only acetonitrile is used as the solvent for a vinylidene cyanide copolymer (or where acetonitrile and water are used as the solvent mixture), the resultant polymer solution is not fluid at such low temperatures.

The fact that certain of the polymer solutions of my invention exhibit such fluidity at relatively low temperatures not only results in greater ease of handling such polymeric solutions, but also is reflected in superior spinning behavior. For example, high spinning speeds can be utilized, e.g., of the order of from about 100 to 135 meters per minute. Moreover, the temperature of the orifice through which the polymer solution is extruded can be varied over a wider range than was heretofore possible, without jeopardizing the spinning operation, such range generally being from about 30° to 110° C.

Trioxane has a higher boiling point than the boiling points of such other solvents as acetonitrile, toluene, and acetone, so that the boiling point of the solvent mixture of trioxane and other solvent is generally somewhat higher than the boiling point which would be exhibited when using such other solvent alone. However, even though the average boiling point is raised due to the pressure of the trioxane, the resultant polymer solution exhibits great fluidity at relatively low temperature, e.g., ambient temperatures as low as about 20° C.

The fact the polymer solutions of my invention exhibit appreciable fluidity at relatively low temperatures is believed to contribute substantially to the superior spinning characteristics that result when such a polymer solution is spun. Thus, the conventional spinning solutions are not fluid at low temperatures, so that when such a solution is extruded and the resulting filament is cooled to a temperature below that at which the filament material becomes a gel, such filament may be broken by the tension exerted thereon at the take-up roll. In contrast, when the polymer solutions of my invention are employed, which solutions exhibit low-temperature fluidity, as such polymer solution is extruded to form a filament and the filament is cooled, the residual material in the filament will still remain relatively fluid and will not gel so rapidly as conventional spinning solutions. Accordingly, the resulting filament may be readily stretched so that the denier can be considerably varied by varying the take-up speed, all without appreciable likelihood of breaking such filament.

By extruding appropriate polymer solutions of my invention, there are obtained filaments which are characterized by a high degree of luster and transparency.

The following examples will more fully illustrate my invention. All parts are by weight unless otherwise stated.

*Example 1*

The following components were mixed together at 50° C. to produce a polymer solution adapted for spinning fibers therefrom:

Component: Amount (grams)
Terpolymer prepared from about 50% vinyl acetate, 49.4% vinylidene cyanide, and 0.6% styrene sulfonic acid (Inherent viscosity=1.8 determined in gamma-butyrolactone, 0.4% concentration) _____ 62.1
Paste solution of copolymer containing 75% N,N-dimethyl acrylamide and 25% vinyl acetate in 88 parts of acetonitrile and 12 parts water (Inherent viscosity=1.9 in gamma-butyrolactone, 0.4% concentration); (solution concentration 21.5% by weight) ____ 22.5
Trioxane _____ 122
Acetonitrile (148 ml.) _____ 107

The foregoing was a clear colorless solution which remained stable indefinitely. This solution was transferred to a stainless steel container equipped with a jet containing five drilled holes, each of 0.042 mm. diameter. Heat was electrically applied, but only to that portion of the steel container supporting the jet and not to the spinning solution. The jet was connected to the container with the spinning solution by means of a short length of one-eighth inch diameter stainless steel pipe. Nitrogen pressure was maintained in the container for the spinning solution at 140 p.s.i.g. to thereby extrude fibers through the jet face, which fibers were taken up at a jet face temperature of 61° C. The resulting fibers were bright and lustrous. The fibers were passed through five feet of room temperature air and were then sufficiently dry to be wound directly on bobbins.

*Example 2*

The procedure of Example 1 was repeated. However, the temperature of the jet face was maintained at 89° C. rather than 61° C. as in Example 1 and the nitrogen pressure maintained on the spinning solution was 300 p.s.i.g. rather than 140 p.s.i.g. It was found that the resultant fibers could be taken up indefinitely at speeds in excess of 100 meters per minute. Upon passing the extruded fibers through five feet of air at room temperature the fibers were dry enough to be wound directly on bobbins. The resultant fibers were clear and lustrous.

Example 3

The procedure of Example 1 was repeated. However, the nitrogen pressure upon the spinning bath was increased to 400 p.s.i.g. and the jet face temperature was maintained at 98° C. Fibers were extruded and the take-up speed was maintained at about 100 meters per minute. Take-up speeds up to about 135 meters per minute could be attained. The resultant fibers had a tenacity of 0.6 gram per denier and an elongation of 60%, which properties compare favorably to those of wet-spun fibers of similar composition prior to drawing.

Example 4

To one part of a copolymer prepared by copolymerizing 45 parts of vinylidene cyanide and 55 parts of vinyl acetate there were added four parts of acetone and four parts of trioxane. The whole was agitated in a container and warmed to refluxing temperature (approximately 60° C.), whereupon a clear solution was obtained. This solution was highly suitable for extrusion to form fibers or for casting on an appropriate surface to form a self-supporting film.

Example 5

One part of the copolymer described in Example 4 was mixed with four parts of acetonitrile and four parts of trioxane, and the whole was then agitated in a container which was warmed to the refluxing temperature. There resulted a clear solution which remained fluid on cooling to room temperature (approximately 25° C.) and remained stable indefinitely. This solution could be extruded to form fibers and also could be applied to a surface to form a film.

Example 6

Trioxane and acetonitrile were added, in the proportions tabulated hereinafter, to one part of a terpolymer obtained by copolymerizing 49.2 parts of vinylidine cyanide, 49.2 parts of vinyl acetate, and 0.6 part of styrene sulfonic acid. The resulting compositions formed clear solutions when heated to 60° C. The behavior upon cooling is also indicated below:

| Parts Trioxane | Parts Acetonitrile | Behavior on Cooling to 25° C. |
|---|---|---|
| 1 | 2.4 | Highly turbid. |
| 1 | 3.2 | Do. |
| 2 | 2.4 | Slightly turbid. |
| 2 | 3.2 | Clear fluid. |

From the foregoing it will be seen that the latter two solutions can be used for fiber formation at room temperature. The former two solutions are also suitable for use in fiber and film formation, but should be used at elevated temperatures.

Example 7

Two solutions were prepared. The first, Solution A, consisted of 100 parts of trioxane and 215 parts of toluene. The second, Solution B, consisted of 100 parts trioxane and 350 parts of toluene. To eight parts of each of these solutions there was added two parts of a copolymer (VYHH-1, Union Carbide Corporation) prepared by copolymerizing 86 parts of vinyl chloride and 14 parts of vinyl acetate. (The inherent viscosity of this copolymer, as determined in methyl ethyl ketone, 0.1% concentration, is 0.44.) Solution A dissolved the copolymer on tumbling at room temperature overnight. Solution B required intermittent warming of the container to about 50–70° C. to thereby result in a clear, colorless, fluid solution, which solution was stable indefinitely at room temperature.

In like manner, a solution of three parts of the foregoing copolymer and seven parts of Solution A was prepared by tumbling with intermittent warming, to thereby form a clear, colorless and stable solution. This solution was somewhat less fluid than the two preceding solutions referred to.

Each of the foregoing three solutions was cast upon a flat surface at room temperature, to thereby form a clear adherent coating as the solvent evaporated.

As a control, one part of the foregoing copolymer was mixed with nine parts of toluene. No solution was obtained.

Example 8

Into each of two jars, A and B, provided with stoppers was introduced 3 grams of staple fiber made of a copolymer containing by weight about 60% acrylonitrile and 40% vinylidene chloride and having an inherent viscosity of 0.9 determined from 0.4 wt. percent solution of the polymer in gamma-butyrolactone based on the weight of the solution, at 25° C. Thereafter a solution consisting of 3 grams of acetone and 3 grams of trioxane was added to Jar A, and a solution consisting of 3 grams of acetonitrile and 3 grams of trioxane was added to Jar B. Each jar was then stoppered and tumbled for 24 hours at room temperature. In each instance there resulted a homogeneous smooth flowing solution which, when cast upon a flat surface, gave a smooth adherent coating as the solvent mixture evaporated.

Example 9

The procedure described in Example 8 was followed; however, there was substituted a staple fiber made of a copolymer containing by weight about 60% vinyl chloride and 40% acrylonitrile and having an inherent viscosity of 1.0 determined as described in Example 8, and 4.5 rather than 3 grams of each solvent component was utilized. Results were obtained which were substantially the same as those described in Example 8.

While the invention has been illustrated by reference to dry spinning techniques, it will, of course, be apparent that the invention also has application in wet spinning processes, i.e., wherein the polymer solution is extruded into a liquid coagulant.

Variations can, of course, be made without departing from the spirit of my invention.

Having thus described my invention, what I desire to secure and hereby claim by Letters Patent is:

1. A method of preparing fibers comprising dissolving 5 to 35 percent by weight of a vinylidene cyanide copolymer containing in excess of about 45% vinylidene cyanide units copolymerized with at least one ethylenically unsaturated monomers in a solvent mixture of 10 to 60% of trioxane and 85 to 10% of another solvent selected from the group consisting of ketones, nitriles, and hydrocarbons, extruding the solution through a shaped orifice, and coagulating the extrudate to form a continuous filamentary material consisting of said vinylidene cyanide copolymer.

2. The method of claim 1, wherein said solution is continuously extruded at a speed of 100 to 135 meters per minute over a temperature range of 30 to 110° C.

3. The method of claim 1 wherein said extrusion is carried out at a temperature of from about 10 to 120° C. and at an extrusion pressure of from about 30 to 1000 pounds per square inch.

4. The method of claim 1 wherein said coagulation is effected by passing said extruded product through air.

5. The method of claim 1 where said coagulation is effective by passing said extruded product into a liquid coagulant.

6. The method of claim 1 wherein the polymeric material is a copolymer containing from about 40 to 50% vinylidene cyanide and from about 60 to 50% vinyl acetate.

7. The method of claim 1 wherein the polymeric material is a copolymer containing from about 40 to 50% vinylidene cyanide, from about 60 to 50% vinyl acetate, and from about 0 to 1% of an ethylenically unsaturated sulfonic acid.

8. The method of claim 1 wherein said fibers are extruded and are taken up at a rate of from about 20 to 135 meters per minute, said take-up rate being greater than the extrusion speed, to thereby effect a stretching of said fibers and orientation of the molecules making up said fibers.

9. A polymer solution adapted to be used in the preparation of polymeric films and fibers, said solution comprising a solvent mixture of 10 to 60% trioxane and 85 to 10% of another solvent selected from the group consisting of ketones, nitriles and hydrocarbons, and 5 to 35% by weight of a vinylidene cyanide copolymer containing in excess of about 45% vinylidene cyanide units copolymerized with at least one ethylenically unsaturated monomers, said solution being characterized by sufficient fluidity to permit stable spinning at speeds of 100 to 135 meters per minute over a temperature range of 30 to 110° C.

10. The solution of claim 9 wherein said ketone is acetone, said nitrile is acetonitrile and said hydrocarbon is toluene.

11. The polymer solution of claim 9 wherein the vinylidene cyanide copolymer is a copolymer containing from about 40 to 50% vinylidene cyanide and from about 60 to 50% vinyl acetate.

12. The polymer solution of claim 9 wherein the vinylidene cyanide copolymer contains from about 40 to 50% vinylidene cyanide, from about 60 to 50% vinyl acetate, and from about 0 to 1% of an ethylenically unsaturated sulfonic acid.

13. A polymer solution adapted to be used in the preparation of polymeric films and fibers, said solution comprising a solvent mixture of trioxane and acetone, and a vinylidene cyanide copolymer containing in excess of about 45% vinylidene cyanide units copolymerized with at least one ethylenically unsaturated monomers dissolved in said solvent mixture.

14. A polymer solution adapted to be used in the preparation of polymeric films and fibers, said solution comprising a solvent mixture of trioxane and acetonitrile and a vinylidene cyanide copolymer containing in excess of about 45% vinylidene cyanide units copolymerized with at least one ethylenically unsaturated monomers dissolved therein.

15. A polymer solution adapted to be used in the preparation of polymeric films, said solution comprising a solvent mixture of trioxane and toluene, and vinylidene cyanide copolymer containing in excess of about 45% vinylidene cyanide units copolymerized with at least one ethylenically unsaturated monomers dissolved in said solvent mixture.

References Cited

UNITED STATES PATENTS

| | | |
|---|---|---|
| 1,922,272 | 8/1933 | Bender _____ 260—29.1 |
| 2,472,842 | 6/1949 | Mouchiroud et al. ___ 264—205 |
| 2,743,994 | 5/1956 | Chaney et al. _____ 264—182 |
| 3,000,859 | 9/1961 | Mirriss et al. _____ 260—67 |
| 3,029,210 | 4/1962 | Groszos _____ 260—29.1 |
| 3,066,008 | 11/1962 | Carpenter et al. _____ 264—182 |
| 3,136,681 | 6/1964 | Johnston _____ 260—30.4 |
| 3,183,201 | 5/1965 | Shimeha et al. ____ 260—32.8 X |
| 3,218,295 | 11/1965 | Cline _____ 260—67 |
| 3,231,543 | 1/1966 | Jamison _____ 260—67 |
| 3,240,742 | 3/1966 | Hahn et al. _____ 260—30.4 |
| 3,242,063 | 3/1966 | Okamura et al. _____ 260—67 X |
| 3,269,988 | 8/1966 | Baude et al. _____ 260—67 |

ALEXANDER H. BRODMERKEL, Primary Examiner.

J. R. DUNCAN, J. H. WOO, Assistant Examiners.